United States Patent
Celetto et al.

(10) Patent No.: US 8,976,873 B2
(45) Date of Patent: Mar. 10, 2015

(54) APPARATUS AND METHOD FOR PERFORMING ERROR CONCEALMENT OF INTER-CODED VIDEO FRAMES

(75) Inventors: Luca Celetto, Udine (IT); Gianluca Gennari, Padua (IT); Manuel Cargnelutti, Tolmezzo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1069 days.

(21) Appl. No.: 12/954,341

(22) Filed: Nov. 24, 2010

(65) Prior Publication Data

US 2012/0128071 A1    May 24, 2012

(51) Int. Cl.
*H04N 7/12*     (2006.01)
*H04N 11/02*    (2006.01)
*H04N 11/04*    (2006.01)
*H04N 7/68*     (2006.01)
*H04N 19/117*   (2014.01)
*H04N 19/139*   (2014.01)
*H04N 19/147*   (2014.01)
*H04N 19/176*   (2014.01)
*H04N 19/192*   (2014.01)

(52) U.S. Cl.
CPC ............ *H04N 7/68* (2013.01); *H04N 7/26058* (2013.01); *H04N 7/26138* (2013.01); *H04N 7/26154* (2013.01); *H04N 7/26244* (2013.01); *H04N 7/26319* (2013.01)
USPC ..................................................... 375/240.27

(58) Field of Classification Search
CPC ....................................................... H04N 7/68
USPC ......................................... 375/240.16, 240.27
See application file for complete search history.

(56) References Cited

U.S. PATENT DOCUMENTS

| | | | | |
|---|---|---|---|---|
| 5,737,022 | A * | 4/1998 | Yamaguchi et al. | 375/240.15 |
| 6,512,795 | B1 * | 1/2003 | Zhang et al. | 375/240.27 |
| 6,590,934 | B1 * | 7/2003 | Kim | 375/240 |
| 7,324,698 | B2 * | 1/2008 | Kong et al. | 382/236 |
| 8,165,210 | B2 * | 4/2012 | Hong et al. | 375/240.16 |
| 2005/0141622 | A1 * | 6/2005 | Seo | 375/240.27 |
| 2006/0013320 | A1 * | 1/2006 | Oguz et al. | 375/240.27 |
| 2007/0147506 | A1 * | 6/2007 | Kwon et al. | 375/240.16 |
| 2010/0118970 | A1 * | 5/2010 | Ye et al. | 375/240.16 |
| 2010/0290530 | A1 * | 11/2010 | Huang et al. | 375/240.16 |

OTHER PUBLICATIONS

Yanling Xu and Yuanhua Zhou, "H.264 Video Communication Based Refined Error Concealment Schemes," IEEE Transactions on Consumer Electronics, vol. 50, No. 4, Nov. 2004, pp. 1135-1141.

(Continued)

*Primary Examiner* — Jeremaiah C Hallenbeck-Huber
(74) *Attorney, Agent, or Firm* — Seed IP Law Group PLLC

(57) ABSTRACT

An embodiment relates to performing error concealment of a corrupted block in a video frame, which is capable of performing a real time reconstruction of corrupted blocks which allow to precisely recover small details and fine movements, in particular, the error concealment apparatus and method according to an embodiment selects a replacement block by taking into account the luminance distortion and the motion characteristics of the video sequence. The latter is represented by the distance of the motion vectors chosen as candidate replacements and the average value of the motion vectors of the blocks surrounding the missing block in the current frame.

38 Claims, 12 Drawing Sheets

(56) References Cited

OTHER PUBLICATIONS

Ming-Chieh Chi, Mei-Juan Chen, Jia-Hwa Liu and Ching-Ting Hsu, "High Performance Error Concealment Algorithm by Motion Vector Refinement for MPEG-4 Video," in IEEE International symposium on Circuits and Systems, vol. 3, pp. 2895-2898, May 2005.

Mei-Juan Chen, Wen-Wei Liao and Ming-Chieh Chi, "Robust Temporal Error Concealment for H.264 Video Decoder," in International Conference on Consumer Electronics, pp. 383-384, Jan. 2006.

Jinghong Zheng and Lap-Pui Chau, Brief Papers, "A Motion Vector Recovery Algorithm for Digital Video Using Lagrange Interpolation", IEEE Transactions on Broadcasting, vol. 49, No. 4, Dec. 2003, pp. 383-389.

Yanling Xu and Yuanhua Zhou, "Adaptive Temporal Error Concealment Scheme for H.264/AVC Video Decoder," IEEE Transactions on Consumer Electronics, vol. 54, No. 4, pp. 1846-1851, Nov. 2008.

Jinghong Zheng, Lap-Pui Chau,"A temporal error concealment algorithm for H.264 using lagrange interpolation," published in IEEE International Symposium on Circuits and Systems, pp. 133-136, 2004.

* cited by examiner

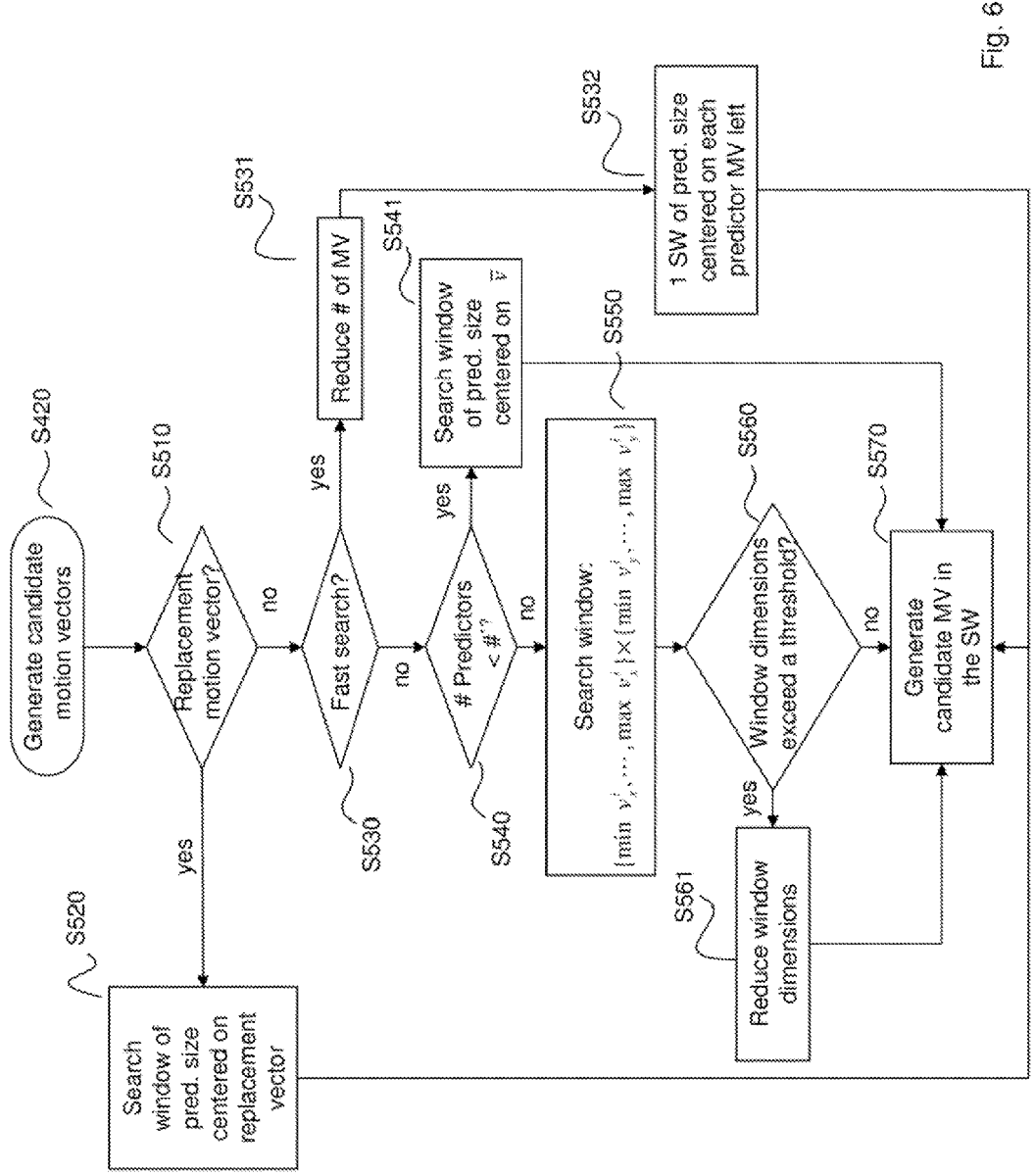

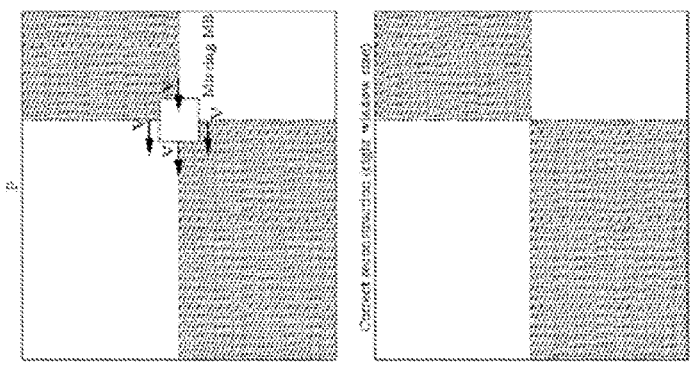
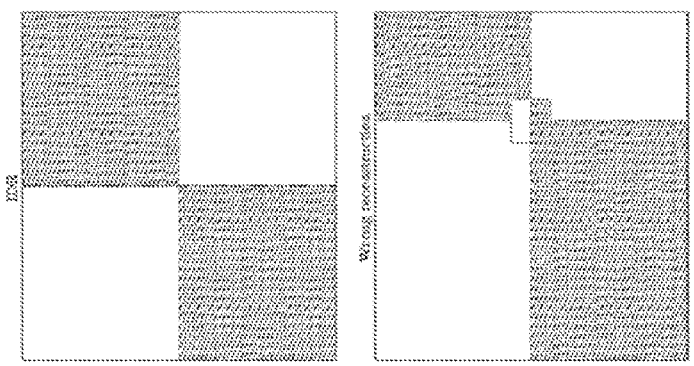
Fig. 19
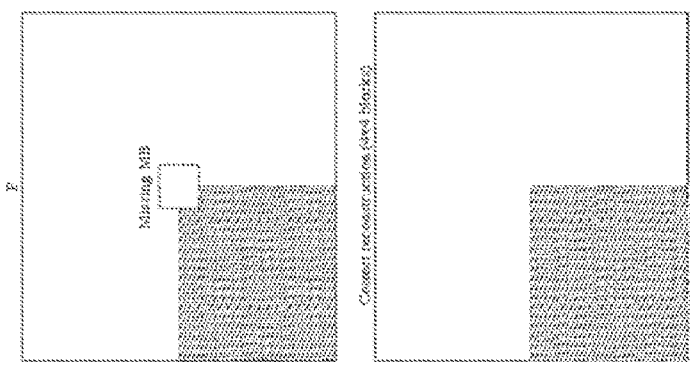
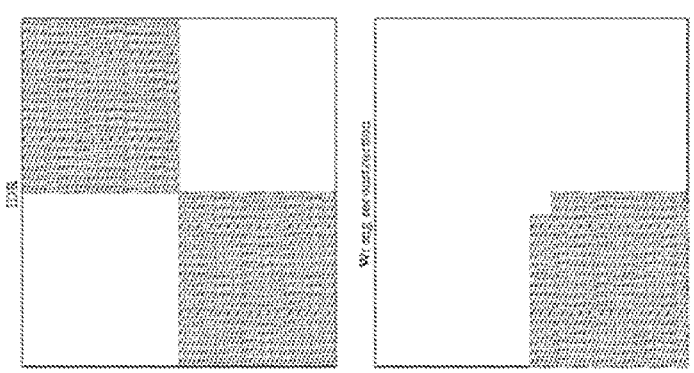
Fig. 20

US 8,976,873 B2

APPARATUS AND METHOD FOR PERFORMING ERROR CONCEALMENT OF INTER-CODED VIDEO FRAMES

TECHNICAL FIELD

An embodiment relates to an apparatus operable to recover lost slices of video frames. In particular, an embodiment relates to determining a best replacement block taking into account the continuity at the block boundaries as well as the smoothness of the motion field.

BACKGROUND

The increasing availability of mobile devices with video coding capabilities and of video wireless sensors, poses a challenge for reliable video transmission. Indeed, due to the high error rate that may occur in the transmission channel, portions of a transmitted frame may be lost or corrupted, thereby drastically reducing the quality of the received image. The reliable reconstruction of missing blocks becomes particularly relevant in differential coding systems, like H.264/AVC, since reconstruction errors in one frame can propagate to successive frames of the video sequence.

Video coding standards, such as the H.264/AVC, propose several solutions for mitigating the problem of packet losses for transmissions over unreliable channels. Firstly, a corrupted frame is decoded and a list of the corrupted macroblocks in the frame is created. In Inter-coded frames the temporal correlation between subsequent frames is high. Therefore, some techniques use information from past and future reference frames to recover the pixels of the lost macroblocks in the current frame. The typical procedure consists of replacing each block of pixels, within the corrupted region, with a block, or a combination of blocks, from the reference frames, pointed to by an appropriately calculated motion vector.

The JVT concealment algorithm is included in the reference implementation of the H.264/AVC standard, the reference implementation including the reference JM decoder developed by the JVT committee (Joint Video Team of ISO/IEC MPEG and ITU-T VCEG). This algorithm subdivides each 16×16 lost macroblock into four 8×8 sub-blocks. For each of the missing sub-blocks, a candidate set of motion vectors is constructed, which includes the motion vectors computed from those of the received adjacent macroblocks, and the null motion vector, corresponding to no motion. The motion vector associated with each adjacent 8×8 block is simply copied or extrapolated from the motion information of the macroblock that contains it, depending on its coding mode. All the motion vectors in the candidate set are tested. The missing macroblock is replaced by the one in the reference frame that minimizes the boundary matching error (BME), defined as the sum of absolute differences (SAD) between the boundary pixels of the candidate macroblock in the reference frame, and the boundary pixels of the blocks surrounding the lost one.

According to the above described scheme, the best candidate sub-block for replacing the missing one is chosen on the basis of a measure of the luminance distortion across the boundary between the candidate macro-block and the correctly received sub-block(s) adjacent to the missing macroblock. This solution may provide acceptable results only if the metric is calculated along a relatively long border and may require that the macroblock is subdivided in 8×8 or 16×16 pixels sub-blocks. Therefore such a method may not be capable of reliably reconstructing small details and fine movements. Moreover, since the choice is made considering only the luminance distortion, this method does not take into account the motion characteristics of the area surrounding the lost macroblock.

An improvement of the concealment method described above is proposed in the article from Y. Xu and Y. Zhou, "H.264 video communication based refined error concealment schemes," Consumer Electronics, IEEE Transactions on, vol. 50, pp. 1135-1141, November 2004, which is incorporated by reference. This document proposes a refined motion compensated temporal concealment that considers motion vectors of all the macroblocks surrounding the lost macroblock, as well as the average and median motion vectors. In this algorithm, each macroblock is subdivided into 8×8 blocks and the best motion vector is found by minimizing a metric defined as the weighted sum of the SAD between pixels $q_i$ of the candidate macroblock and the pixels $r_{i,h}$ and $r_{i,v}$ of horizontally and vertically adjacent blocks, respectively. This approach is schematically described in FIG. 21.

Also this reference selects the replacement sub-block by calculating the luminance distortion across an 8-pixel border. Moreover, although the method considers the sub-blocks in the reference frame pointed at by several motion vectors of macroblocks surrounding the lost macroblock, the motion information of the area including the lost macroblock is not used in the selection procedure of the best replacement candidate.

A further error concealing procedure is described in the article by M.-C. Chi, M.-J. Chen, J.-H. Liu, and C.-T. Hsu, "High performance error concealment algorithm by motion vector refinement for mpeg-4 video," in IEEE International symposium on Circuits and Systems, vol. 3, pp. 2895-2898, May 2005, which is incorporated by reference. In this reference, the recovery procedure is done recursively, starting from candidate motion vectors calculated from the macroblocks located above and below the missing one, and refined in a second pass that takes into account the lateral blocks. More precisely, a set of candidate motion vectors is generated by combining collocation motion vectors in the reference frame and the difference of top/bottom motion vectors. The collocation motion vector of the lost macroblock in the previous frame is the base motion vector. For each candidate motion vector, a side match function is evaluated between the known valid pixels and the motion-compensated ones. The motion vector with minimum side matching distortion is selected as the concealed motion vector for the lost macroblock.

Although the above-described method chooses the candidate motion vectors by considering the information contained in correctly received motion vectors in the reference frame, this solution also provides acceptable results only if the metric is calculated along a relatively long border, and requires that the macroblock is subdivided in 8×8 or 16×16 pixel sub-blocks. Therefore such a method may not be capable of reliably reconstructing small details and fine movements. Moreover, as in the previous methods, the choice of the best replacement candidate is done only considering the luminance distortion, thereby not taking into account the motion characteristics of the area surrounding the lost macroblock.

In the article by M.-J. Chen, W.-W. Liao, and M.-C. Chi, "Robust temporal error concealment for h.264 video decoder," in International Conference on Consumer Electronics, pp. 383-384, January 2006, which is incorporated by reference, a method is proposed, where the motion vectors used for the recovery of the missing macroblock are extrapolated from the motion vectors of the surrounding blocks. In particular, the proposed technique considers 4×4 blocks in the corrupted frame, and the candidate motion vector is computed from a linear combination of the motion vectors of surrounding blocks. A similar technique is described in the reference "A temporal error concealment algorithm for h.264 using lagrange interpolation," by J. Zheng and L.-P. Chau, published in IEEE International Symposium on Circuits and Systems, pp. 133-136, 2004, which is incorporated by reference. In this case, the candidate motion vector is computed using a polynomial interpolation.

The methods described in the above-cited references perform a boundary matching on a 4×4 pixels sub-block. However also in this case, the best candidate replacement sub-block is chosen among a limited number of sub-blocks in the reference frame, i.e. the sub-block pointed at by the interpolated motion vectors. Moreover, also in this case, the choice of the best replacement candidate is done only considering the luminance distortion, thereby not taking into account the motion characteristics of the area surrounding the lost macroblock. A further disadvantage of these techniques is that the predictor motion vectors are generated by interpolating the motion vectors surrounding the lost macroblock. However, the predictors are generated in a static manner and the techniques give good results only if the motion is only reliably described by the interpolated predictors. There may be, however, no possibility to estimate the quality of the generated predictors. In conclusion, the methods described above only produce satisfactory reconstructions in a limited number of video sequences, such as the conventional "Foreman" sequence.

An adaptative concealment scheme is proposed in the paper by Y. Xu and Y. Zhou, "Adaptive temporal error concealment scheme for H.264/AVC video decoder," IEEE Transactions on Consumer Electronics, vol. 54, pp. 1846-1851, November 2008, which is incorporated by reference. Here, the recovery procedure is applied to 16×16 or 8×8 blocks, according to the coding mode of surrounding correctly received macroblocks. Moreover, a variable size full search window is opened in the reference frame. All the motion vectors in the search window are tested, and the block that minimizes the weighted OBMA metric is selected to replace the missing block.

This method chooses the replacement sub-block among all the sub-block pointed at by motion vectors in a search window in the reference frame. However, the macroblock is subdivided into 8×8 or 16×16 sub-blocks. Consequently, this method may not be capable of reliably reconstructing small details and fine movements. Moreover, since the choice is made only considering the luminance distortion, this method may not take into account the motion characteristics of the area surrounding the lost macroblock.

In conclusion, all the methods described above select the replacement sub-block based only on the boundary distortion between the area in the candidate sub-blocks in the reference frame and the area including the missing block in a current frame. Moreover, although some of the methods consider a fine subdivision of the macroblock in order to correctly reconstruct small details, this methods may fail in reconstructing, in a reliable manner, a lost block in case of fast or non-homogeneous movements. However, in decoding systems, it may be desirable to reconstruct in a reliable manner lost sub-blocks, even in the case of fast or irregular movements, while controlling the computation load to enable error concealment in real time decoding schemes.

SUMMARY

Given these problems with the existing technology, an embodiment is provided of a system capable of performing error concealment which improves the quality of reconstructed video frames also in the case of areas coding fast or irregular movements and/or in presence of fine details moving along the picture.

An embodiment recovers missing pixels by performing a search procedure in the reference frames, in order to determine the best block according to a specified metric. The search procedure is performed based on information included in available motion vectors of correctly received or previously recovered sub-blocks surrounding a lost block. Correctly received or recovered sub-blocks will be addressed in the following as available sub-blocks. Moreover, the choice of the replacement sub-block among the candidate sub-blocks in the reference frame is performed by using a metric that takes into account continuity at the block boundaries as well as the smoothness of the motion field.

In an embodiment, an error concealment apparatus for performing error concealment of a current block in a video frame is provided. The current block is subdivided in a plurality of sub-blocks and the error concealment apparatus comprises a selection unit adapted to determine a set of candidate motion vectors based on predictor motion vectors of available sub-blocks surrounding the current block, wherein the available sub-blocks are correctly received or recovered sub-blocks. Further, for each sub-block of the current block a matching unit selects, among the candidate motion vectors, a replacement motion vector that minimizes a cost function. The cost function is defined as a sum of a constraint term based on the distance of a candidate motion vector from a reference motion vector and a measure of the distortion between a candidate sub-block in the reference frame pointed to by the candidate motion vector and a correctly received or previously recovered sub-block adjacent the sub-block in the current block. The reference motion vector is based on a combination of the selected predictor motion vectors.

An embodiment of a method for performing error concealment of a current block in a video frame is provided. The block is subdivided into a plurality of sub-blocks and the error concealment method comprises the step of determining, at a selection unit, a set of candidate motion vectors based on predictor motion vectors of available sub-blocks surrounding the current block. The available sub-blocks are correctly received or recovered sub-blocks. For each sub-block of the current block, a matching unit selects a replacement motion vector, among the candidate motion vectors that minimize a cost function. The cost function is defined as a sum of a constraint term based on the distance of a candidate motion vector from a reference motion vector and a measure of the distortion between a candidate sub-block in the reference frame pointed to by the candidate motion vector and a correctly received or previously recovered sub-block adjacent the sub-block in the current block, said reference motion vector being based on a combination of the selected predictor motion vectors.

The cost function defined in an embodiment considers, besides the luminance distortion, also the relation between the motion vector of the candidate sub-block and the motion vectors of a correctly received sub-block in the area comprising the lost block. In this manner, the replacement macroblock is chosen taking into account motion characteristics of the correctly received block surrounding the lost block. Therefore, the replacement sub-block may both minimize the boundary luminance distortion and assure the continuity of the motion field of the area including the lost block.

BRIEF DESCRIPTION OF THE DRAWINGS

The accompanying drawings are incorporated into and form a part of a specification to illustrate several embodiments. These drawings together with the description serve to explain principles of several embodiments. The drawings are only for the purpose of illustrating examples of how an embodiment may be made and used, and are not to be construed as limiting the disclosure to only the illustrated and described embodiments. Features and advantages may become apparent from the following and more particular description of the various embodiments as illustrated in the accompanying drawings, in which like reference numbers refer to like elements:

FIG. 6 is a flow chart describing additional steps which may be used in a method for performing error concealment of a block in a video frame according to an embodiment;

FIGS. 19-20 are schematic drawings illustrating the effect on the correction performed with a method and apparatus according to an embodiment;

DETAILED DESCRIPTION

In the following description, for explanatory purposes specific details are set forth in order to provide a thorough understanding thereof. However, it may be evident that one or more embodiments may be practiced without these specific details. Furthermore, well known structures and devices are only described in a more general form in order to facilitate the description thereof.

In the following description the term "macroblock" and "block" are used with the same meaning and with the term "sub-block" is indicated the constituting parts of a macroblock.

An embodiment is based on the observation that commonly used error concealment methods are based on schemes for selecting a correctly received block to be used for replacing a missing block, which are not capable of reliably reconstructing small details and fine movements. Moreover, although some known reconstruction schemes use a fine subdivision of the lost block, they do not consider motion characteristics of the area surrounding the lost block. Finally, even if some methods, such as interpolative techniques on 4×4 blocks, take into account the motion vectors for determining the best replacement for a lost block, they consider the motion characteristics in a static manner and thus do not allow using the motion vectors that better predict the motion of the sequence. The known methods may, therefore, produce reconstructed images, which appear as highly fragmented.

According to an embodiment, an apparatus for performing error concealment is adapted to reconstruct a lost block by using sub-blocks of a reference frame, which minimize a cost function that takes into account a constraint term based on the distance of a candidate motion vector of a correctly received block adjacent the lost block from a reference motion vector, and a measure of the distortion between a candidate sub-block pointed at by the candidate motion vector and the block surrounding the lost block. The reference motion vector is defined by a combination of motion vectors corresponding to correctly received sub-blocks surrounding the lost block.

An embodiment of the cost function defined above allows determining a replacement block which takes into account not only the smoothness of the recovered area across the borders between different blocks by minimizing the luminance distortion, but also allows choosing the block corresponding to a motion vector that more closely reflects the motion characteristics of the blocks surrounding the missing one. In other words, an embodiment defines a criterion that not only allows reducing the distortion between a candidate sub-block and correctly received sub-blocks surrounding the lost block, but also increases the coherency of the motion vectors belonging to said blocks.

Figure 1:
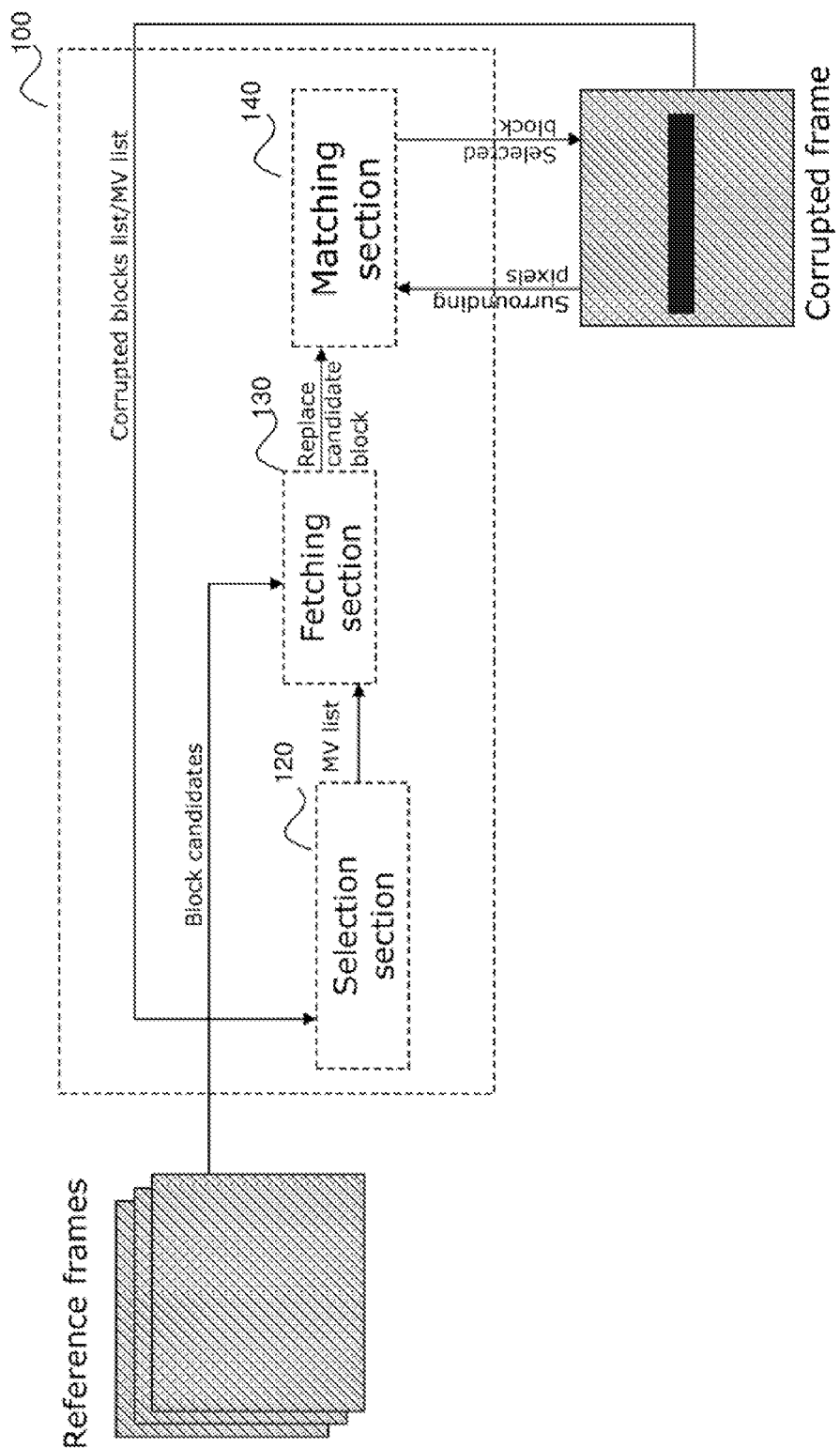
FIG. 1 is a schematic drawing illustrating an apparatus for performing error concealment according to an embodiment.

FIG. 1 illustrates an error concealment apparatus 100 according to an embodiment. The error concealment apparatus 100 may receive a corrupted frame including one or more lost blocks. If more than one macroblock is missing from the corrupted frame, the missing macroblock(s) may be recovered starting from the outer regions of the video frames and converging towards the center, according to what is done in the JVT scheme. As an example, the missing block may correspond to a macroblock of 16 pixels and may be divided into 16 4×4 sub-blocks. However, the present disclosure is not limited to such a solution and may as well work on macroblocks subdivided into four 8×8 blocks, or two 8×16 or 16×8 blocks, etc.

A selection unit 120 is adapted to gather or select the motion vectors of correctly received or previously recovered blocks that surround the lost macroblock. Depending on the coding scheme used for the frame, the selection unit 120 may find one correctly received motion vector for each adjacent block or it may find a motion vector for each sub-block constituting the correctly received block. The motion vector may be included as information coded in each block/sub-block in the corrupted frame currently decoded. The motion vectors coded in correctly received blocks are indicated herein with the terms predictor motion vectors or predictors. An example of a selection scheme for predictor motion vectors will be described with more details with reference to FIG. 7.

The selection unit 120 further determines, based on the selected predictor motion vectors, a list of candidate motion vectors, which may be used for determining the best replacement motion vector. The determined list of candidate motion vectors is output into a fetching unit 130 adapted to access one or more correctly received frames. With the term determining is meant, here and in the following, any operation aiming at obtaining a set of motion vectors which may be used for finding a replacement for a lost sub-blocks. Determining candidate vectors may, for instance, include selecting at least one vector among a set of available motion vectors or generating at least one vector based on available information. As an example, motion vectors may be included as motion information in each decoded sub-block and the list of candidate motion vectors may include all the motion vectors whose components lie within the maximum and minimum components among the predictor motion vectors. Alternatively, the candidate motion vectors may be generated based on the predictor motion vectors, i.e. by combining them, or may be generated using interpolative techniques. The aforementioned frames, which will be referred to as "reference frames" throughout the application may include frames temporally preceding the corrupted frame or frames temporally following the corrupted frame. In a common decoding apparatus using an inter-prediction coding or a inter-prediction bi-directional coding, these frames are normally used for coding an actual frame as a difference with respect to the preceding/following one and therefore are also available to the error concealing apparatus. The fetching unit 130 can therefore fetch in a reference frame a plurality of correctly received sub-blocks pointed at by the generated candidate motion vectors. A matching unit 140 is adapted to receive as input the generated motion vectors and the sub-blocks in the reference frame pointed at by the generated motion vectors. Each pair of replacement candidate sub-block and motion vector is then inserted in a suitable cost function, which will be evaluated for each pair of candidate motion vector and candidate sub-block in order to determine the candidate pair that is more suitable for replacing the missing sub-block.

Clearly, an important task of an embodiment of the selection unit 120 is determining the candidate motion vectors. Once the candidate motion vectors are known, the choice of a candidate sub-block in the reference frame is univocal.

Although the error concealment apparatus 100 includes a fetching unit 130, the task performed by this unit may be as well performed by the selection unit 120.

The constraint term in the cost function may be defined as a norm of the difference between the candidate motion vector and the reference motion vector. In an embodiment, the reference motion vector may be defined as the average of the selected predictor motion vectors. With the term average of the predictor motion vectors here and throughout the application is meant any one of an arithmetic mean of the components of the vectors, a geometric or quadratic mean of the components of the selected predictor motion vectors or a median or geometric median, etc.

The constraint term appearing in the cost function may also be multiplied by a weighting factor. In this case, the matching unit 140 may be further adapted to determine the weighting factor in an optimal manner. In some particular cases, the value of the weighting factor, which minimizes the distortion, may fall in the range of 0.02 to 0.3. This value may be, however, derived experimentally, and may depend on the decoded frame and the testing conditions, such as resolution and the like. More precisely, the optimal weighting factor may be estimated by pretending that a few correctly received blocks are instead lost. At this point, one may perform the recovery procedure for different values of the weighting factor and determine the value that minimizes the reconstruction distortion between two correctly received sub-blocks.

Concerning the other term in the cost function, several metrics, which give a measure of the distortion between the replacement sub-block and a correctly received sub-block, adjacent the sub-block in the current block to be replaced may be used. According to an embodiment, the measure of the distortion between the replacement sub-block and a correctly received sub-block adjacent to the current block is an outer boundary matching algorithm metric (OBMA). The outer boundary matching algorithm may be defined as the sum of absolute differences between the outer boundary pixels of the candidate sub-block and the boundary pixels of the sub-block adjacent to the lost one. The outer boundary matching algorithm may alternatively be evaluated on a two pixel thick boundary.

An embodiment of the constraint term and the metric appearing in the cost function are discussed in a more detailed manner with reference to FIGS. 11 to 17.

According to a further realization, the selection unit 120 may be further adapted to generate in the reference frame a search window, which is defined so as to include the prediction motion vectors. The selection unit 120 will subsequently generate as candidate motion vectors all the motion vectors pointing within the defined search window. In the application, this concept is expressed by saying that the candidate motion vectors are generated in the search window.

In addition, in a further embodiment, the dimensions of the search window may be reduced to predefined dimensions. Further, the selection unit 120 may center the reduced search window on the average predictor motion vector. Accordingly, the apparatus may still be capable of performing error concealment in real time without deteriorating the performance of the apparatus.

Alternatively, the selection unit 120 may be adapted to define in the reference frame a search window centered on the average motion vector.

In a further realization, i.e. the fast search solution, the selection unit 120 may alternatively generate candidate motion vectors pointing within a plurality of search windows, each search window being centered on a predictor motion vector. In this case, the selection unit 120 may be set so that if the components of two or more predictor motion vectors differ less than a predefined threshold, only one search window for all said predictor motion vectors will be defined. This allows reducing the computational load required for determining the candidate motion vectors without deteriorating the quality of the replacement procedure.

Once the matching unit 140 has determined a replacement motion vector, said replacement motion vector may be fed back into the selection unit 120. Subsequently, the selection unit 120 may define in the reference frame a refinement search window of a predefined size and centered on the replacement motion vector and generate refined candidate motion vectors within the refinement search window.

The matching unit 140 may at this point select, among the refined candidate motion vectors, a refined replacement motion vector that minimizes the cost function computed at a higher pixel resolution. This procedure, may be repeated for instance at ½ pixel precision and at ¼ pixel precision. The predefined size may be chosen so as to define a refinement search window smaller than the starting reference window. An example of the refinement procedure is discussed with further details with reference to FIG. 8.

An advantage of an embodiment is that the search procedures at higher pixel resolution may be performed on windows of a predefined size which is smaller than the size of the starting window. The refinement window may be, for instance, a 2×2 pixel window. Obtaining reliable results performing a refined search in a small refinement window may be possible because the refinement search window is centered on the replacement vector. Indeed, once a candidate for a replacement motion vector has been selected, it is expected that the motion vector that produces the best results lies in a relatively small area around the selected replacement vector. Since the area to be searched is now reduced, it may be possible to perform a higher pixel search without requiring high computational power.

Figure 2:
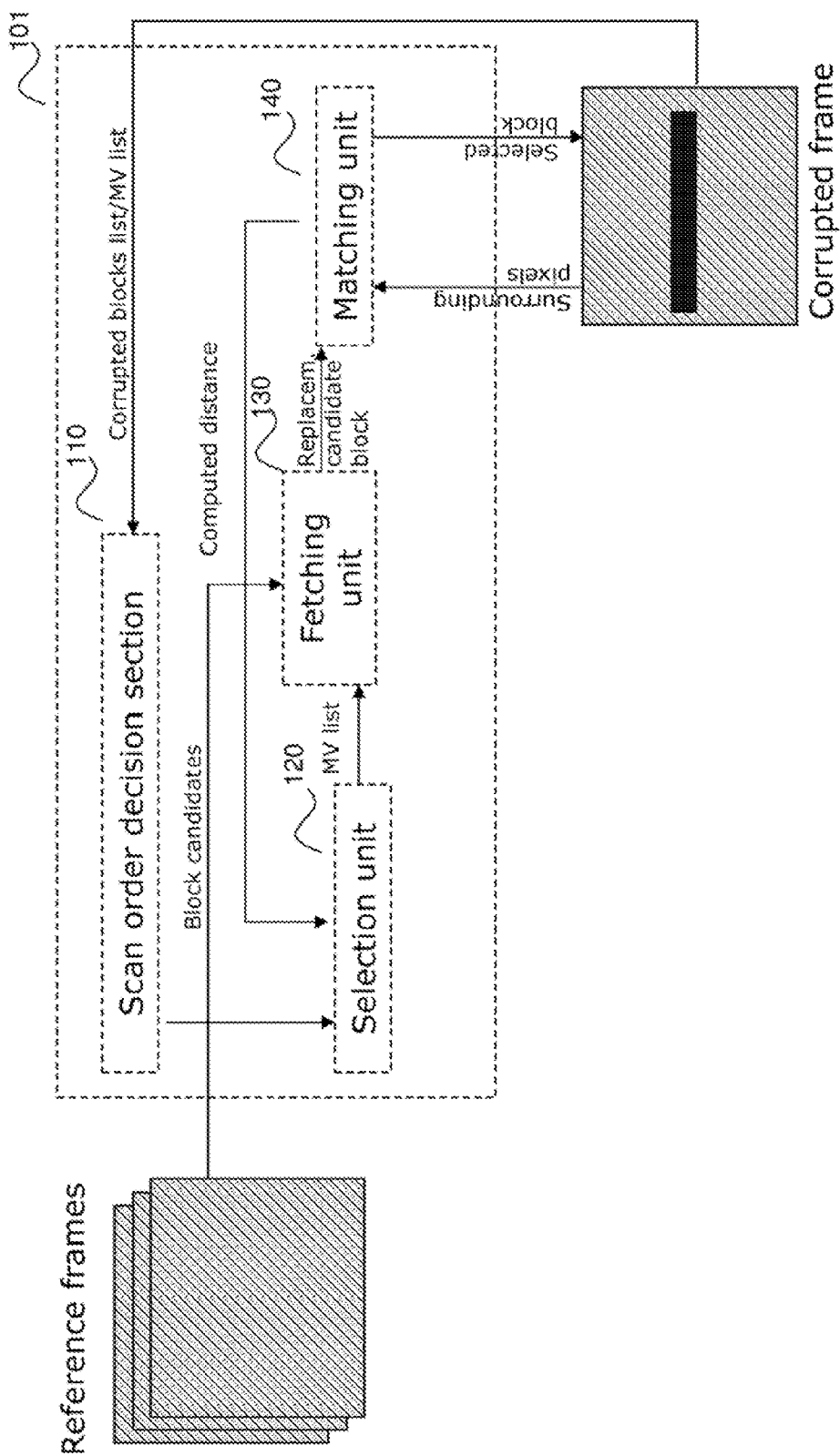
FIG. 2 is a schematic drawing illustrating an apparatus for performing error concealment according to a further embodiment.

FIG. 2 shows an alternative embodiment of an error concealment apparatus 101. The error concealment apparatus 101 includes further to all the elements described with reference to FIG. 1 also a scan order decision unit 110 capable of determining the recovery order of the sub-blocks of the lost block. The list of corrupted blocks is input into the scan order decision section 110 which selects the recovery order using an adaptive procedure. More precisely, the sub-blocks surrounded by the highest number of correctly received sub-blocks will be recovered first. Once one sub-block is recovered, it is included in the list of correctly received sub-blocks. An embodiment of the adaptive recovery procedure will be more clearly explained with reference to FIGS. 9 and 10.

Figure 3:
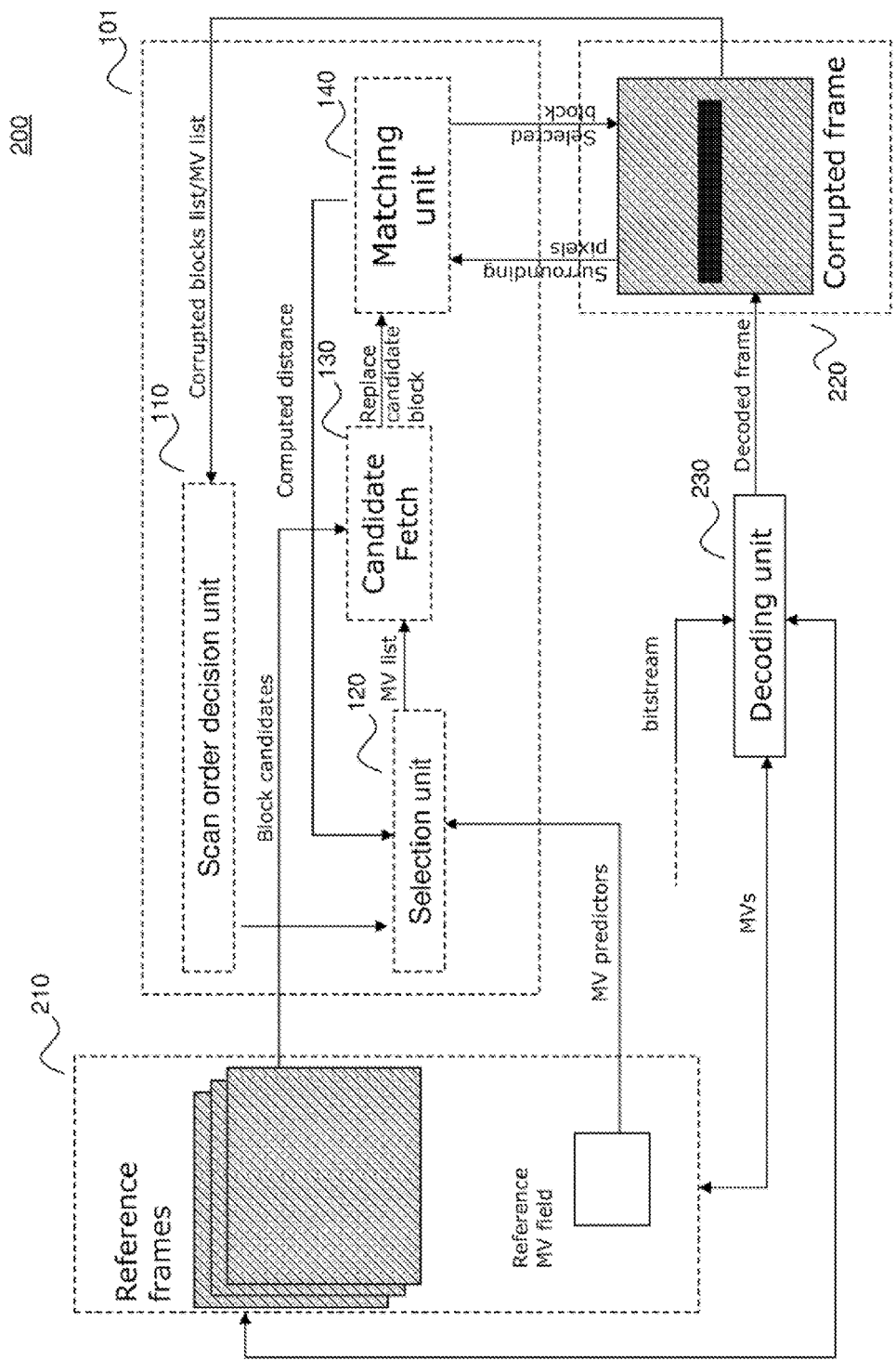
FIG. 3 is a schematic drawing illustrating a decoding system including the apparatus for performing error concealment according to an embodiment.

FIG. 3 shows an embodiment of a decoding apparatus for decoding video frames including the error concealment apparatus 100 or 101 according to an embodiment. The decoding system 200 further includes a first memory 210 adapted to store at least one reference frame and a second memory 220 to store the current frame (eventually corrupted). The decoding system 200 may further include a decoding unit 230 configured to decode received frames and to feed correctly decoded reference frames into the memory 210. Further, the decoding unit 230 may also be configured to extract from the correctly received reference frames, a reference motion vector's field. The reference motion vector field includes the predictor motion vectors, which may be fed from the memory 210 to the selection unit 120. According to this configuration, the extraction of the predictor motion vectors is carried out in the decoding unit 230 and the selection unit 120 only needs to select the predictor motion vectors associated with the block currently concealed. However, in an alternative embodiment, the selection unit 120 may also be configured to perform the extraction of the predictor motion vectors for a current block to be concealed. Although the decoding system 200 includes a first and a second memory 210, 220, it may be possible to configure the decoding system 200 so as to have only a memory adapted to store both the reference frames and the current frame, wherein for current frame is intended the frame on which error concealment is performed.

Figure 4:
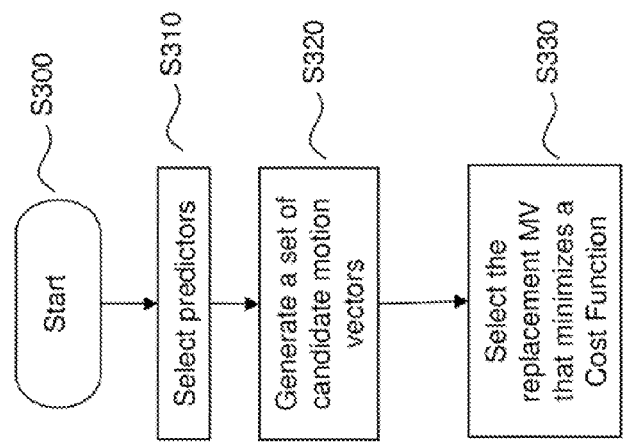
FIG. 4 is a flow chart illustrating the steps of a method for performing concealment of a block in a video frame according to an embodiment.

FIG. 4 is a flow chart describing an embodiment of a method for performing error concealment of a block in a video frame. As explained with reference to FIG. 1, the block is subdivided into a plurality of sub-blocks. At step S310, predictor motion vectors of available sub-blocks, i.e. correctly received or successfully recovered sub-blocks, surrounding a current block are selected.

Figure 7:
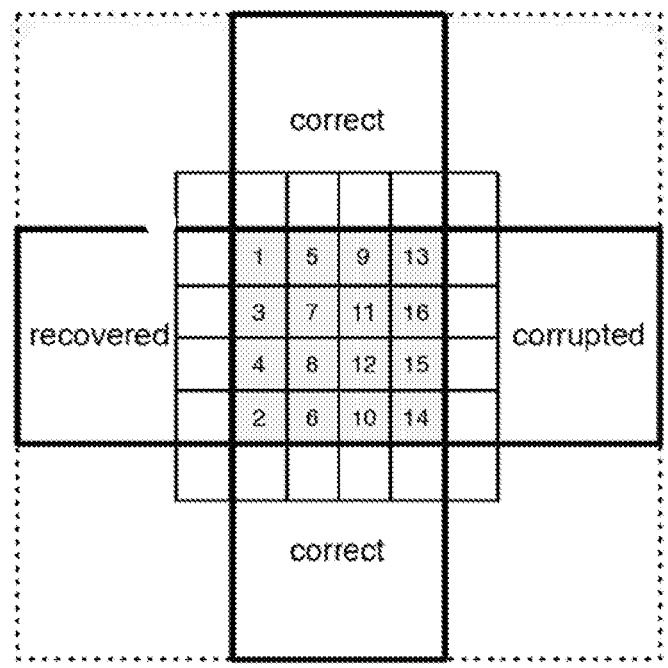
FIG. 7 is a schematic drawing illustrating a selection scheme for predictor motion vectors in a frame including a corrupted block according to an embodiment.

An embodiment of a scheme describing how the predictor motion vectors or simply predictors may be selected is shown in FIG. 7. Although described in relation to FIG. 4, this scheme is general and may as well be used in other embodiments. The predictor motion vectors are all the available motion vectors of the sub-blocks surrounding the corrupted block in the current frame (the central block in the figure). The example in FIG. 7 illustrates a block composed of 16 4×4 sub-blocks and, in this case, the predictor motion vectors will be the available motion vectors of the 20 sub-blocks adjacent to the borders of the corrupted block including the sub-blocks at the edges. In the illustrated case, the blocks on the top, bottom and left of the lost block are correctly received, while the block at its right is corrupted. In this case the correctly received sub-blocks are 16 and therefore the number of predictors will be at most 16. This number may be reduced if two or more sub-blocks have the same motion vector.

Otherwise, if the 20 sub-blocks surrounding the corrupted block are all correctly received, the set of predictor motion vectors may include all the motion vectors of these sub-blocks. In addition to the motion vectors of the 20 sub-blocks, it may also be possible to consider the zero motion vector and the average of the available motion vectors in the sub-blocks surrounding the lost block, i.e. the average predictor motion vector. Further, depending on the coding mode of a surrounding block, a 4×4 sub-block adjacent to the lost block may inherit the motion vector of a larger block that contains it. In this case sub-blocks belonging to the same block will have the same motion vector.

Further, in step 320 candidate motion vectors are determined based on the selected predictor motion vectors. The candidate motion vectors may be determined once for the current block or, alternatively may be generated for each sub-block of the current block. The selection of predictors and the generation of the candidate motion vectors may be performed by a selecting unit as the one described with reference to FIGS. 1 to 3. In step S330, for each sub-block of the current block, a replacement motion vector among the candidate motion vectors is selected so as to minimize a cost function. Step 330 may be performed by a matching unit as described with reference to FIGS. 1 to 3.

An embodiment of the cost function is a sum of two terms and is evaluated for each candidate motion vector. In particular, the cost function is a sum of a constraint term based on the distance of a candidate motion vector from a reference motion vector. The second term of the cost function is a measure of the distortion between a candidate sub-block in the reference frame pointed to by the candidate motion vector for which the cost function is evaluated and a correctly received or previously concealed sub-block adjacent to said sub-block in the current block. The reference motion vector is obtained by a combination of the selected predictor motion vectors.

Alternative definitions of the cost function used in an embodiment of the method of FIG. 3 were already described with reference to FIGS. 1 and 2 and will not be described here again.

Figure 5:
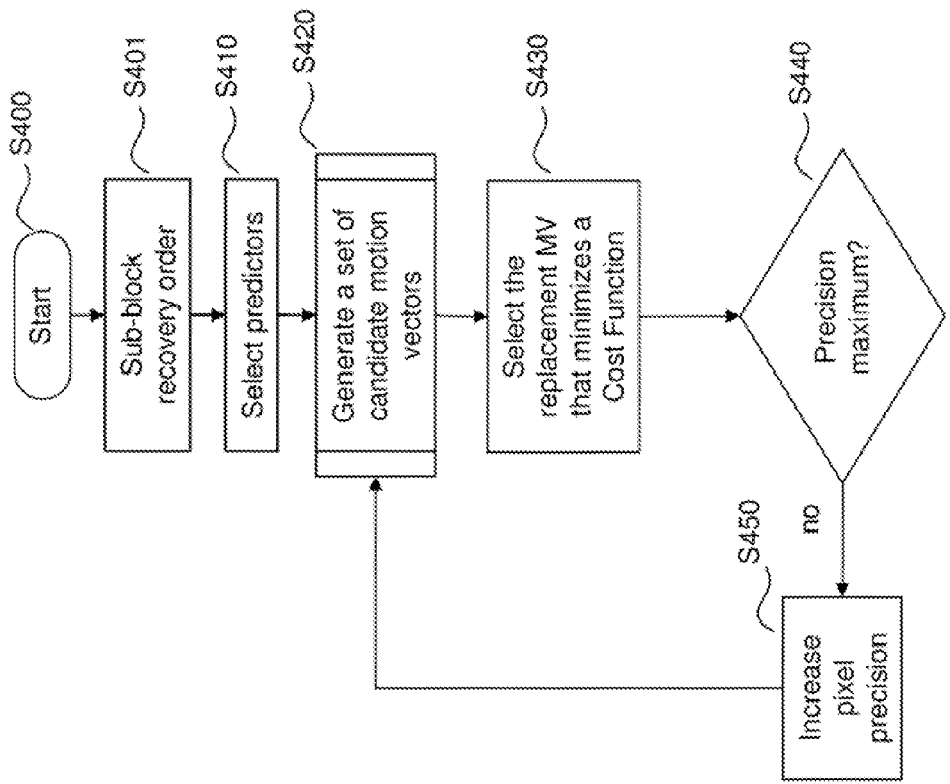
FIG. 5 is a flow chart illustrating a method for performing error concealment of a block in a video frame according to a further embodiment.

FIG. 5 is a flow chart describing a method according to a further embodiment. Steps S410 to S430 correspond to steps S310 to S330 described with reference to FIG. 4. In addition, in step S401 it is determined the recovery order of the sub-blocks of the missing block. This step will be described with more details with reference to FIGS. 9 and 10. Although the flow chart of FIG. 4 includes step 401, and a suitable choice of the recovery order may improve the performance of the method and the quality of the reconstruction, an embodiment of the error concealment method may omit this step, which is optional.

Further, at step S440, it is determined whether the replacement motion vector was determined by evaluating the cost function at a maximum predefined pixel precision. The maximum pixel precision may be defined depending on the coding scheme and on the motion characteristics of the area surrounding the missing block. In an embodiment, for maximum precision, it is intended that the search of the replacement motion vector is performed with a resolution of ¼ pixel precision or more. More precisely, an embodiment determines at a first step a replacement motion vector by evaluating the cost function at a predetermined pixel precision. If said pixel precision does not coincide with the maximum pixel precision, the search is refined by increasing the pixel precision and performing step S420 and S430 again. In conclusion, steps S420 to S450 are repeated until the desired precision is reached. The precision may be incremented by a factor of, for example, ½ at each repetition. However, the incrementing step may be different depending on the application.

FIG. 6 depicts a flow chart describing in further detail an embodiment of how the candidate motion vectors are generated in step S420. Step S510 in FIG. 5 decides whether a replacement motion vector has already been selected. If the answer is NO, the control passes to step S530. In step S530, it is decided whether the method is a fast search method and in the affirmative case steps S531 and S532 are performed.

The steps S530 to S532 summarize an embodiment of the fast search method. This embodiment is based on the idea of starting from a motion vector and performing the search of the replacement motion vector by determining candidate motion vectors around the selected starting vector. Once a local minimum for a particular cost function is found, then the same analysis is performed around said local minimum. The process goes on until convergence, i.e. until no better solutions can be found.

Accordingly, at step S531 the set of prediction motion vectors selected in step S410 is considered. The number of predictor motion vectors is eventually reduced. More precisely, it may occur that starting from two predictor motion vectors whose components differs less than a predetermined threshold value, the search of the best replacement motion vector converges to the same vector. In this case, the predictor motion vectors selected in step S410 are redundant and, for efficiency purposes, may be eliminated from the list. Consequently, the list of predictor motion vectors is chosen so as to include only vectors whose distance from the other motion vectors in the list is larger than a certain threshold. In order to do so, a threshold value $d_{min}$ may be fixed so that when the difference of both components of two predictor motion vectors is larger than said threshold value $d_{min}$, the two vectors are included in the list. Otherwise, one of the two vectors is excluded. Clearly, the threshold value may be optimally determined based on the requested precision. In step S532 for each predictor motion vector left, a search window of a predefined size is defined in the reference frame.

Subsequently, a set of candidate motion vectors pointing within the defined search windows is created at step S570 and subsequently the replacement motion vector is selected as described already with reference to steps S420 to S415.

Figure 8:
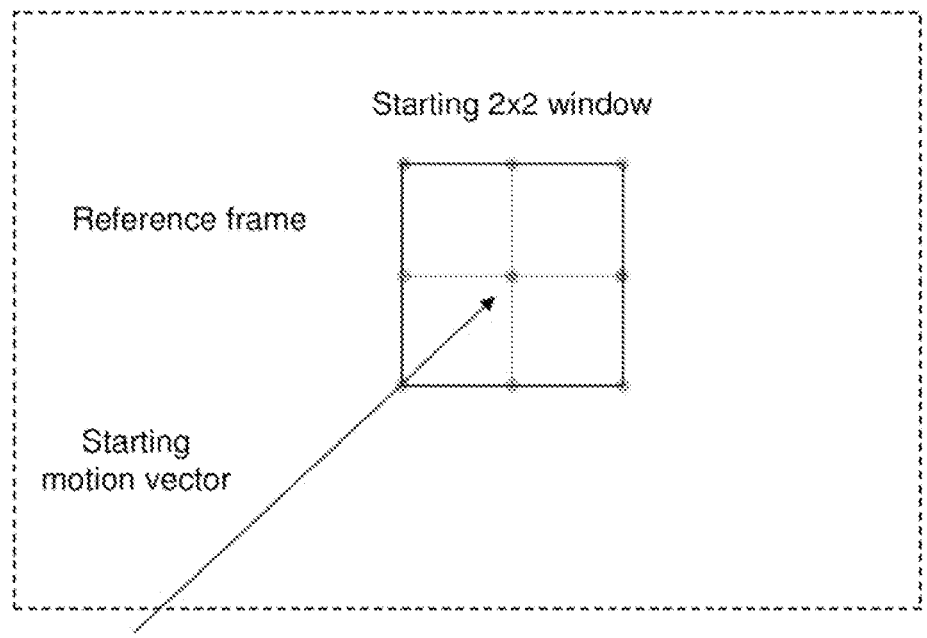
FIG. 8 is a schematic drawing illustrating an example of search window according to an embodiment.

FIG. 8 schematically illustrates a search window which may be defined in step S532. In step S532 for each predictor motion vector chosen in S531, a search window of 2×2 pixels centered on the predictor motion vector may be defined. Subsequently, a local minimum of the cost function is determined and a new window of 2×2 pixels centered on the determined local minimum is defined. The process is iterated until the value of the cost function evaluated on the vectors belonging to the new window decreases. Otherwise, if the predictor motion vectors in the new window cause the cost function to increase, the process is stopped and the replacement motion vector among the ones previously tried, which produces the smallest value of the cost function, is chosen as the best motion vector for the window. The process may also be stopped if the distance between the selected replacement motion vector and the starting prediction motion vector exceed a certain threshold value.

In order to avoid evaluating the cost function on equal vectors, each sub-block may include a list of all the vectors already tested. In this manner, if two subsequently defined windows include the same vector, one of these may be skipped, thereby increasing the performance of the method. Once a candidate motion vector is found for all the predictors, the best candidate among the replacement motion vectors is selected and the search is refined as described with reference to steps S440 and S450 in FIG. 5.

Although in this particular example, the search window is a 2×2 pixel window, it is understood that one may also choose a smaller or bigger window according to the coding scheme and the precision required.

An advantage of the embodiment described in steps S530 to S532 and S570 (FIG. 6) with respect to other methods is that for a search window of predefined dimensions, the maximum number of analyses to be performed increases in a linear manner with the maximum set distance between the predictor and the search window, while other methods tends to perform a number of analyses that grows quadratically with the size of the search window.

If in step S530 it is decided not to perform a fast search, then the control passes to step S540. Steps S540 to S561 summarize the idea of a full search scheme. The full search scheme is based on the idea that if correctly received blocks surrounding the lost block have different motion vectors, a search method based on the choice of one among these motion vector will privilege only one among the described movement. In particular, the metric will choose the motion vector describing the movement that minimizes the distortion in the luminance. On the other hand, if the movement is not homogeneous, discarding already received motion vectors for performing the search may lead to finding a non-optimal replacement sub-block. In order to obviate this drawback, an embodiment described in FIG. 6 defines in the reference frame a search window and generates for each sub-block in the lost block all the motion vectors included in the search window. The best replacement motion vector will be then selected among the motion vectors generated in the search window. The search window may either be defined through the coordinates of its edges (the top left corner and bottom right corner), or through the range within which the motion vector is varied in order to find the luminance sub-blocks to be tested.

At this point, suitable dimensions for the window are defined. Indeed, if the window is too big, it may include areas of the reference frame that do not correlate with the lost block in the current frame. This effect is increased if the error concealment is performed on a block subdivided in sub-blocks including few pixels. As an example, if the missing block is sub-divided into 16 sub-blocks of 4×4 pixels, it may occur that the method chooses a replacement sub-block, which is not correlated with the lost sub-block, but has a similar border.

In addition, the window dimensions may be chosen according to the format of the video frames. More precisely, a search window suitable for a QCIF format (176×144) may not be suitable for a CIF format (352×288).

Consequently, an embodiment adaptively defines the search window based on the motion characteristics within the correctly received blocks adjacent to the lost block. Accordingly, if the motion is uniform and homogeneous, the search windows may be rather small, whereas if the motion is irregular, the search window may be larger.

To take into account all the above mentioned issues, the search window is determined based on the motion vectors of correctly received sub-blocks surrounding the lost block.

In step S540 it is determined whether the number of available motion vectors surrounding the lost block is larger than a certain threshold number. In case the number of predictor motion vectors is smaller than a predefined threshold number, a search window defined based on the predictor motion vectors is not considered reliable and the control passes to step S541. In a particular example, the threshold number may be 4. However, this threshold may vary from case to case.

If in step S540 it is determined that the available predictors are less than the predetermined threshold number, step S541 is executed. Accordingly, the available predictors are averaged so as to obtain an average predictor motion vector and a search window of a predefined dimension centered on the average motion vector is defined in the reference frame. The search window may be a 4×4 pixels window. However, depending on the format of the video frames, the dimensions of the search window may be extended or reduced. Subsequently, a set of candidate motion vectors pointing within the defined search windows is created at step S570 and subsequently the steps S430 to S450 described with reference to FIG. 5 are executed in order to select the best candidate for a replacement motion vector. Alternatively, the search window of predefined dimensions may be centered on the null vector.

If in step S540 it is determined that the number of available predictors is larger than the predefined threshold number, step S550 is executed. In this step, for a lost block, a search window is defined, which will then be used for determining the replacement motion vector of each sub-block in the current lost block. The search window may be centered on the zero motion vector or on the average predictor motion vector and subsequently the motion vectors of the correctly received sub-blocks surrounding the lost macroblock are chosen. As already described with reference to FIG. 7, the selected predictor motion vectors may be at most 20. The search window in the reference frame will be defined by the set $\{\min v_x^i, \ldots, \max v_x^i\} \times \{\min v_y^i, \ldots, \max v_y^i\}$, where $(v_x^i, v_y^i)$ are the components of the i-th predictor motion vector. In other words, for each predictor motion vector, the dimensions of the search window are increased so as to include the x and y components of the predictor motion vector in case that these components are larger than the x and y sides of the search window. In step S560, the window dimensions are analyzed and, if said dimensions exceed a predefined window threshold value, the dimensions of the search window are reduced.

As an example, the threshold number for the predictors may be set to 4. However, this number may be adapted to the particular coding scheme and to the precision required.

This step may be useful if a lost block belongs to a frame whose motion characteristics are irregular. In this case, the search window defined in the reference frame in step S550 may be rather large. On the other hand, if the search window is too large, the method may not be suitable for real time decoding. Therefore, if the window threshold is set as the maximum window size, which may be used in real time applications, the method may still be used in real time. The search window may be, for instance, reduced to the maximum allowed dimensions for performing real time decoding or may be reduced to a predefined search window according to the used coding scheme.

Moreover, in order to obtain more reliable results, the search window in the reference frame may be centered on the average predictor motion vector. In this manner, the search window will define the area in the reference frame, which will most likely include the best replacement motion vector.

The reduction of the window dimensions is performed in step S561. Subsequently, in step S570, a set of candidate motion vectors is generated in the previously defined search window in the reference frame. Alternatively, if in S560 it is determined that the dimensions of the window defined in step S550 do not exceed the window threshold, step S570 is performed in order to generate candidate motion vectors in the search window defined in step S550. The method proceeds then with steps S430 to S450 in FIG. 5.

Considering again steps S560 and S561, when the search window is made smaller, it may happen that the new motion vector is excluded from the search window. This may happen especially during recovering of sub-blocks close to the border of the frame.

In this situation, it may happen that the window in the reference frame entirely or partially lies outside the boundary of the image, thereby making it impossible to determine for the aforementioned sub-block a set of candidate motion vectors and consequently, a replacement sub-block. This would lead to a fast deterioration of the quality of the video sequence.

In order to avoid this, a search window centered on the zero motion vector is opened and the cost function is evaluated on motion vectors generated to said search window. Moreover, since the average vector for the block close to the border may be rather distant from the candidate motion vectors generated around the zero motion vector, the cost function may be evaluated only taking into account the luminance distortion between a candidate sub-block in the reference frame and a correctly received sub-block adjacent to the sub-block to be replaced.

Although steps S510 to S570 where all included in a single flow chart, it is clear that an embodiment does not necessarily require all the steps, and a error concealment apparatus may also be configured to perform only a subset of the steps described in FIG. 6.

Figures 9, 10, 11, 12:
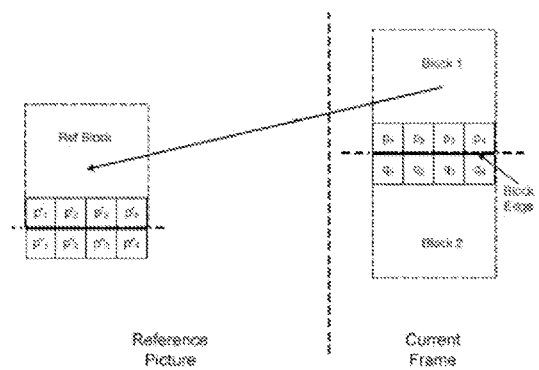
FIGS. 9 and 10 are schematic drawings illustrating possible recovery order schemes for sub-blocks of a corrupted frame according to an embodiment.
FIG. 11 is a schematic drawing illustrating the computation of a boundary matching metric according to an embodiment.
FIG. 12 is a schematic drawing illustrating the computation of a boundary matching metric according to another embodiment.

FIGS. 9 and 10 schematically describe the order in which the sub-blocks are recovered within the missing block. This task may be performed by the scan order decision section 110. Alternatively, it may be performed directly in the selection unit 120.

In the examples of FIGS. 9 and 10, the lost block has been sub-divided in 16 sub-blocks of 4×4 pixels. However, another choice for the subdivision may be chosen based on the nature of the video sequence and on the used coding scheme. The choice of subdividing the missing block in 4×4 sub-blocks may allow following in a reliable manner complex movements.

Subdividing the block into 16 sub-blocks may require defining an efficient recovery order for the sub-blocks. It may be important to maximize the number of correctly received or already recovered pixels adjacent to the sub-block being actually recovered. Clearly, the recovery order of the sub-blocks may vary depending on the location of the correctly received blocks surrounding the missing one, and, therefore, it is possible to adapt it based on the context of the area surrounding the missing block. As an example, the recovery order may be decided based on the 16 sub-blocks adjacent to the sub-blocks defining the borders of the missing block or edge sub-blocks. Accordingly, the edge sub-blocks in the missing block are recovered starting from the sub-blocks that have a higher number of adjacent correctly received pixels. The recovery then proceeds from the edges of the missing macroblock to the internal sub-blocks of the missing macroblock.

For example, FIG. 9 illustrates a situation, wherein the top and bottom blocks are correctly received while the right block is corrupted. In addition, the left block was previously recovered in this procedure. The previously recovered macroblocks are considered to have the same importance as correctly received macroblocks. In this situation, the top left and bottom left sub-blocks of the block to be recovered both have two recovered/correctly received adjacent sub-blocks. The top left sub-block may be recovered first followed by the bottom left sub-block. Alternatively, the bottom left sub-block may be recovered first followed by the top left sub-block. Once the first two blocks are recovered, they may be considered as correctly received in the recovery procedure. Consequently, the sub-block below the top left block will now have two adjacent recovered sub-blocks as well as the sub-block immediately above the bottom left sub-block. Therefore, these two blocks will be recovered as next starting from top and going towards the bottom. The newly recovered sub-block within the missing macroblock will be subsequently used in order to determine which sub-block has to be recovered next.

According to an embodiment the configuration in FIG. 9, the sub-blocks of the missing macroblock will be recovered from left to right within the block and from the borders to the center within the columns in an alternate manner. However, another scheme may also be applied for deciding the recovery order sub-blocks surrounded by the same number of correctly received pixels.

FIG. 10 illustrates a different situation in which only the blocks at the bottom and on the left of a missing macroblock are correctly received/recovered, while the blocks at the top and on the right are not yet received. In this case, the sub-block at the bottom left edge may be recovered first followed by the sub-block above the bottom left block.

In the following, an embodiment of the cost function and the metric used to calculate a value of a distortion generated by the replacements sub-block is described with reference to FIGS. 11 and 12. The distortion caused by the replacement may be calculated according to several designs and algorithms. Moreover, each of the algorithms calculating the distortion may be evaluated on a border of one or more pixels.

A first choice for the metric in the cost function may be the boundary-matching algorithm (BMA). This metric analyzes the luminance distortion across two regions by evaluating the sum of the differences between the luminance values of the border of the candidate sub-block in the reference frame and the luminance values in the current frame adjacent to the block to be concealed. In this case, the metric can be written as:

$$D_{BMA} = \sum_{i=1}^{4} |\tilde{Y}_{p'_i} - Y_{qi}|, \quad (1)$$

where $\tilde{Y}_{p'_i}$ is the luminance value of the candidate replacement sub-block in the reference frame and $Y_{q_i}$ is the luminance value of the correctly received sub-block adjacent the sub-block to be recovered in the lost block. This metric may allow choosing the sub-block that maximizes the smoothness of the border between two blocks, thereby avoiding big luminance discontinuities across the borders.

A problem that may occur using this metric is that if the metric is calculated on 4×4 sub-blocks, the distortion may be evaluated only on 8 pixels. Consequently, the metric may select as a best replacement sub-block, the sub-block having a border similar to the border of the correctly received sub-block adjacent to the missing one. In this manner, the replacement block is chosen according to the border characteristics. This behavior however, may lead to bad results if applied to an area crossed by oblique edges.

As an alternative choice for the cost function, an overlapping BMA (OBMA) metric may be used. In this case, the distortion is evaluated taking into account only one side of the border between the lost block and the correctly received block in the reference frame. More precisely, in the overlapping BMA metric, a sum of the absolute differences is evaluated between the luminance values of the boundary pixels outside the candidate replacement sub-block and the boundary pixels outside the sub-block to be recovered. Accordingly, the metric is given by:

$$D_{OBMA} = \sum_{i=1}^{4} |\tilde{Y}_{p''_i} - Y_{qi}|, \quad (2)$$

where $\tilde{Y}_{p''_i}$ is the luminance value of the pixels outside the boundary of the candidate replacement sub-block in the reference frame and $Y_{q_i}$ is the luminance value of the correctly received sub-block adjacent the sub-block to be recovered in the lost block. Contrary to the previous metric, this technique may favor replacement sub-blocks that assure a better continuity among correctly received sub-blocks. In other words, this embodiment chooses as a replacement the sub-block in the reference frame, which has the same contour of pixel of the missing sub-block. Moreover, this metric further allow deciding the number of border pixels on which the distortion is evaluated. This may allow increasing the pixels used for determining the replacement sub-block. On the other hand, using a large number of border pixels may increase the possibility of including pixels in the evaluation that do not correlate with the sub-block to be recovered. Experimental comparison between sub-blocks recovered using a one-pixel border and a two-pixel border showed that the selection carried out by evaluating the metric on a two-pixel border gave better results.

Another example of a metric that may be used in the algorithm is the IN-IN metric with extrapolation. The aim of this metric is to avoid the polarization phenomenon that leads to a deterioration of the border which may occur if the BMA metrics is used. In order to obtain this, the external and internal areas of a sub-block to be replaced are compared, giving more importance to the comparisons between overlapping areas. Contrary to the overlapping BMA, the IN-IN metric compares internal areas. In other words, a sum of the absolute difference between the pixels on the internal border of the candidate sub-block and the pixels on the internal border of the lost sub-block is evaluated. Clearly, since the internal borders of the lost sub-block do not include any luminance values, these values will be extrapolated. In order to evaluate the extrapolated luminance values, an external border of two pixels is chosen and for each side of the lost sub-block, the luminance values are obtained by the following formulas:

$$Y_T(x,y) = Y(x,y-1) + [Y(x,y-1) - Y(x,y-2)] \quad (3.1)$$

$$Y_B(x,y) = Y(x,y+1) + [Y(x,y+1) - Y(x,y+2)] \quad (3.2)$$

$$Y_L(x,y) = Y(x-1,y) + [Y(x-1,y) - Y(x-2,y)] \quad (3.3)'$$

$$Y_R(x,y) = Y(x+1,y) + [Y(x+1,y) - Y(x+2,y)] \quad (3.4)$$

where $Y_T$, $Y_B$, $Y_L$ and $Y_R$ are the extrapolated luminance values on each side of a sub-block in the lost block. Since following this embodiment, pixels at the edges of sub-blocks are extrapolated twice, the two values will be combined so as to obtain a mean value. FIG. 12 illustrates an example of the IN-IN metric, wherein the values in the lost block were recovered based on the luminance values of a 2-pixels border of correctly received sub-blocks surrounding the lost block.

One of these metrics may then be combined to form a constraint term, which takes into account the smoothness of the motion vectors. As already described, the cost function is given by a sum of a metric for calculating the luminance distortion and a constraint term taking into account the distance between the candidate motion vector currently analyzed and a reference vector obtained by calculating the average of the available predictor motion vectors of correctly received sub-blocks surrounding the lost macroblock.

By introducing this term, in the event that the distortion metric calculated on two different replacement sub-blocks gives the same values, the second term forces a choice of the sub-blocks pointed to by the motion vector which is closer to the average predictor. In this manner, it may be possible also use in the selection process of the best replacement candidate information relating to motion characteristics of the blocks.

In an embodiment, the best replacement motion vector is chosen by selecting the motion vector that minimizes the following cost function:

$$\cos t_{MV} = D_{OBMA} + \lambda \|\vec{v}_i - \tilde{\vec{v}}\|^2 \qquad (4),$$

wherein $\tilde{\vec{v}}$ is an average predictor obtained by averaging the components of all the available predictors for the lost block and $\vec{v}_i$ is the i-th candidate motion vector. The first term on the right hand side of equation (4) is the metrics, which gives a measure of the distortion between a candidate sub-block in the reference frame and a correctly received sub-block adjacent the sub-block in the currently decoded block. The second term on the right hand side of equation (4) is the constraint term representing the distance of a candidate motion vector from a reference motion vector. Although in equation (4) the distance of the candidate motion vector from the average predictor is calculated as a quadratic norm, any other expression indicating a relative position between the candidate vectors and the average predictor may be used. The term λ is a weighting factor, whose optimal value may be determined experimentally based on the video sequence currently decoded. Moreover, the OBMA metric may be calculated on a two pixels border.

Figure 14:
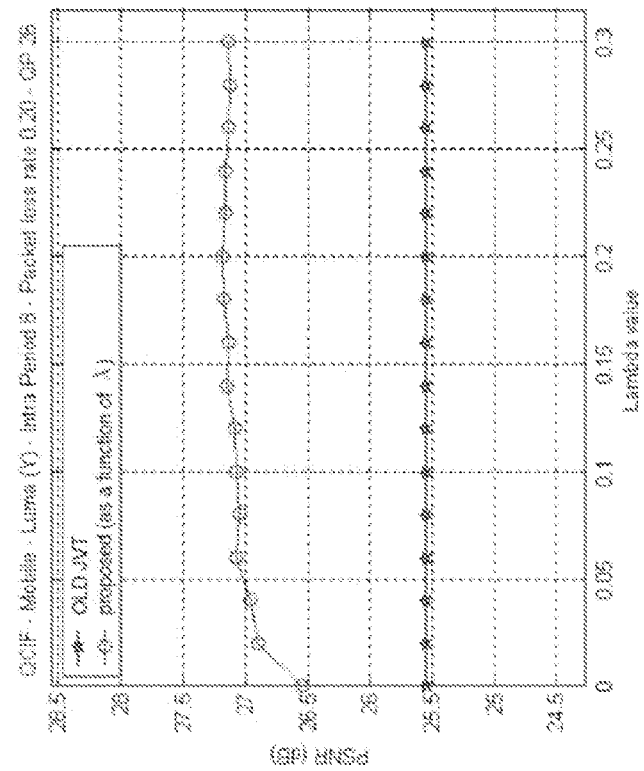
FIGS. 13-18 are plots comparing results obtained by a method and apparatus according to an embodiment with results obtained using standard techniques.
Figure 13:
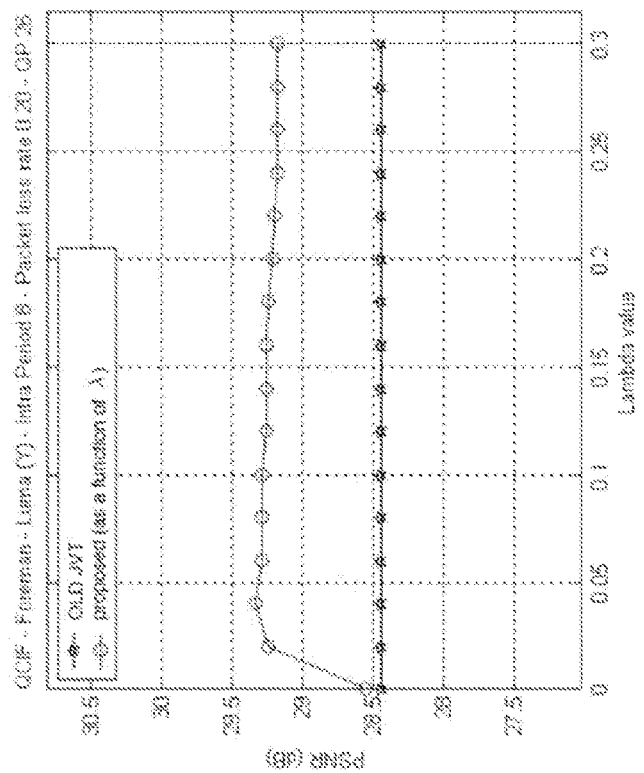

FIGS. 13 and 14 show an example of the gain that may be achieved by adding the constraint term as a function of lambda as described in equation (4). In the figures is plotted the peak signal-to-noise ratio (PSNR) obtained by using the standard JVT recovery procedure, and of an embodiment of a proposed technique for values of λ. From this plot, it is possible to understand how a proposed embodiment is sensitive to variations of the λ parameter. This information is therefore useful for understanding whether the choice of a non-optimal value of λ may lead to a fast deterioration of the reconstruction quality. As may be seen from FIG. 13, except for the case λ=0, where the metric is the only criterion for selecting the replacement sub-blocks, the gain in the peak signal-to-noise ratio is substantial, for values of λ between 0.02 and 0.3, deviations from the best value are within a range of 0.4 dB. In the results plotted in FIG. 13, obtained by performing error concealment on the "foreman" video sequence, the value of λ that produces the best results is around 0.02.

In conclusion, while the weighted constraint term may allow improving the quality of reconstructed video frames, an embodiment of the algorithm has been proven to be robust with respect to variations of λ within a certain predefined range. In other words, in an embodiment the value of λ is not critical for the performance of the algorithm if said value is chosen within a predefined range, which may be determined experimentally. For the frame analyzed with reference to FIG. 13, although the best result is obtained for a value of λ of approximately 0.02, any value in the interval between 0.02-0.3 may be used without substantially affecting the reconstruction quality of the video frame.

FIG. 14 shows a plot of the same quantities as plotted in FIG. 13 for a different video sequence ("mobile" sequence). For this sequence, the value of λ for which the best results are obtained is higher and is around 0.2. However, also in this case, deviations from the best possible result are within a range of 0.4 dB for values of λ comprised between 0.02 and 0.3. In other words, also for the "mobile" sequence any value in the interval between 0.02-0.3 may be used without substantially affecting the reconstruction quality of the video frame.

Figure 16:
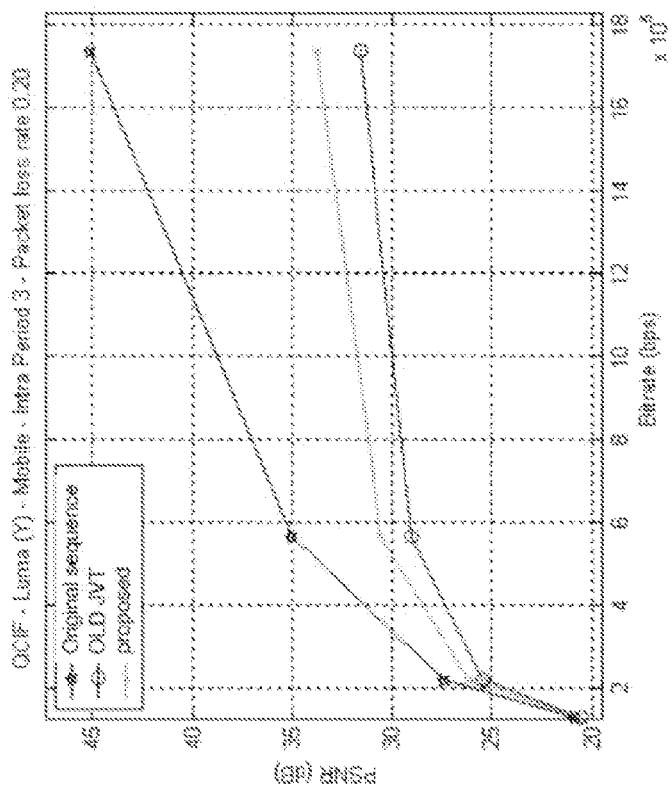
Figure 15:
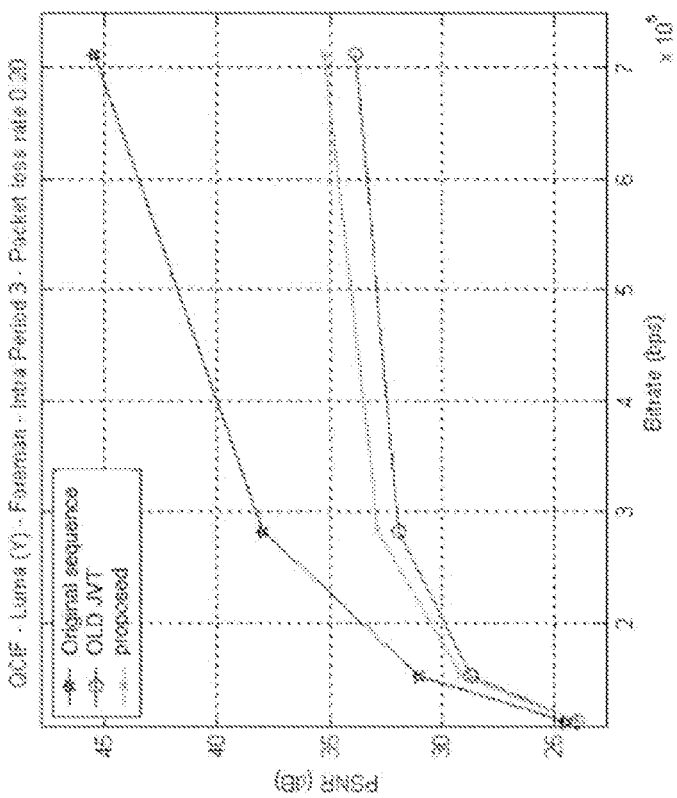

FIGS. 15 and 16 compare the peak signal-to-noise ratio of JVT standard procedure and of an embodiment of the proposed technique as a function of the bit rate for $P_{loss}$=0.2 for the sequences "foreman" and "mobile", respectively. As may be seen from these figures, the results obtained by an embodiment of the present apparatus and method are better than the results obtained by the standard methods compared with the original sequence.

Figure 17:
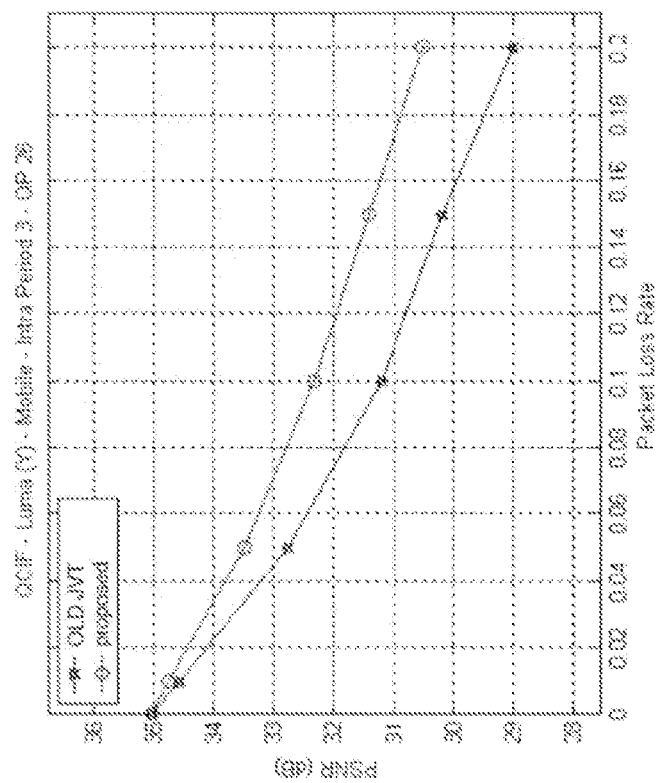
Figure 18:
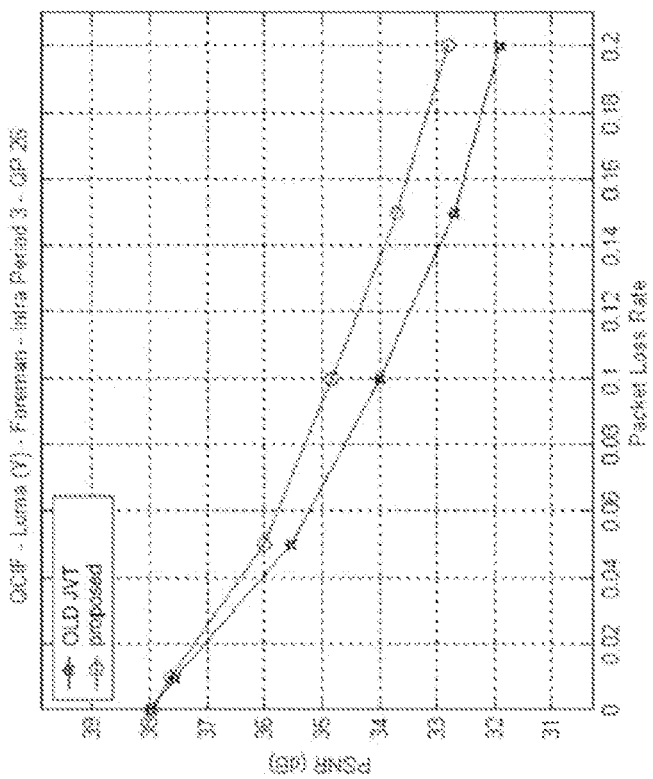
Figure 21:
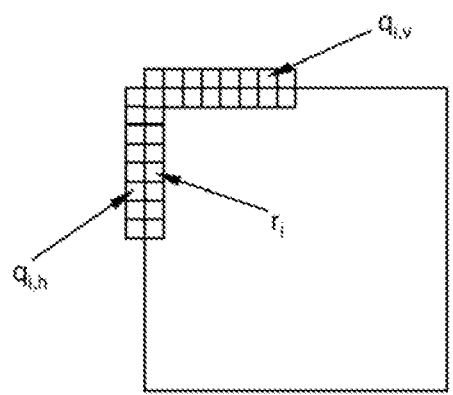
FIG. 21 is a schematic drawing illustrating the computation of a boundary matching metric according to a conventional technique.

FIGS. 17 and 18 show the reconstruction peak signal-to-noise ratio obtained using the JVT standard and an embodiment of the proposed solution when the sequences are coded with H.264/AVC quality parameter QP=quantization pass for different values of $P_{loss}$. Also from these plots, respectively obtained by performing error concealment on the "foreman" and "mobile" video sequences, it may be seen that an embodiment of the proposed technique gives a consistent gain for all bit rates and packet loss probabilities.

Although the discussion above refers to one reference frame, it is also possible to recover blocks using several frames. For instance, in case of bi-directional inter-coding, each sub-block adjacent to the lost block may include a vector referring to a previous frame and a vector referring to a following frame. In this case, an embodiment of the method defines for each sub-block a backward window and a forward window. All the steps described with reference to FIGS. 4 to 6 may be performed in both reference frames. Accordingly, an embodiment of the method minimizes a cost function defined in the backward window and a cost function defined in the forward window. Once the best predictor in the two reference frames is chosen, the matching section will decide whether to select the motion vector in the backward window or the motion vector in the forward window. This choice may, for instance, be done by choosing the best predictor that gives the smallest value among the cost functions calculated in the backward and forward frame.

FIGS. 19 and 20 are schematic drawings showing the reconstruction of a corrupted block using a standard method and a method according to an embodiment. In the figures are represented a reference frame (IDR frame) and a predictive coded frame (P-frame).

FIG. 19 shows a simple example, wherein a block is missing in the center of the frame. The IDR frame is the correctly received frame, while the P-frame is to be corrected. In this case, a standard method that subdivides the missing block into sub-blocks including more than four pixels per side may not be able to correctly recover the image, which may then appear fragmented as is evident from the bottom left and right picture of FIG. 19.

In FIG. 20, the P-frame is obtained by translating the previous frame (reference frame) to the right by d. Also in this case, we consider a missing block in the P frame and all the blocks surrounding the missing blocks are included with a given motion vector pointing to an area in the reference frame to the left of the missing block. The reconstructed frame below the reference frame was obtained by performing a standard full search algorithm on a search window of a predefined size centered on the zero vector. In this case, the search window covers the area in a range [−d/2, d/2] and will therefore not include the vector d, thereby producing a fragmented, reconstructed image. In contrast thereto, using an embodiment of the apparatus and method, the search window is centered on the average vector and will therefore be defined by the range [d/2−d/2, d/2+d/2]=[0,d]. In this case, the search window includes the vector d, and therefore, leads to the result depicted in the bottom left frame.

A further embodiment relates to the implementation of the above-described various embodiments using hardware and software. It is recognized that various embodiments may be implemented or performed using computing devices (processors). A computing device or processor may, for example, be a general-purpose processor, digital-signal processor, etc. Various embodiments may also be performed or embodied by a combination of these devices. Further, various embodiments may also be implemented by software modules, which are executed by a processor or directly in hardware. Also a combination of software modules and hardware implementation may be possible. The software modules may be stored on any kind of computer-readable storage media, for example, RAM, IPROM, EPROM, flash memory registers, hard disk, etc.

In summary, an embodiment relates to performing error concealment of a corrupted block in a video frame, which is capable of performing a real time reconstruction of corrupted blocks which allows to precisely recover small details and fine movements, in particular, an embodiment of an error concealment apparatus and method selects a replacement block by taking into account the luminance distortion and the motion characteristics of the video sequence. The latter is represented by the distance of the motion vectors chosen as candidate replacements and the average value of the motion vectors of the blocks surrounding the missing block in the current frame.

A system such as a computer or video system may include a video decoder incorporating an embodiment of a lost-block recapture technique as described above. Components of the system may be disposed on a same or respective integrated-circuit dies.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
a first unit configured to determine a first level of distortion associated with a first region of a reference first image and with a recovered second region of a second image that is being decoded with reference to the first image, the second region being adjacent to an unrecovered third region of the second image;
a second unit configured to determine a first relationship between a reference motion vector and a motion vector for the second region; and
a third unit configured to replace the unrecovered third region of the second image in response to the level of distortion associated with the first and second regions and in response to the relationship between the reference motion vector and the motion vector for the second region, wherein the third unit is configured to replace the unrecovered third region of the second image with the first region of the first image in response to a sum of the level of distortion associated with the first and second regions and the relationship between the reference motion vector and the motion vector for the second region.

2. The apparatus of claim 1 wherein the first unit is configured to determine the level of distortion by determining a difference between a value of a pixel adjacent to an edge of the first region of the first image and a value of a pixel adjacent to an edge of the second region of the second image.

3. The apparatus of claim 1 wherein the first unit is configured to determine the level of distortion by determining a difference between a value of a pixel adjacent to an edge of the first region of the first image and a value of a pixel adjacent to an edge of the third region of the second image.

4. The apparatus of claim 1 wherein the first unit is configured to determine the level of distortion by determining a difference between a value of a pixel that belongs to and that forms an edge of the first region of the first image and a value of a pixel that belongs to and that forms an edge of the second region of the second image.

5. The apparatus of claim 1 wherein the first unit is configured to determine the level of distortion by determining a difference between a value of a pixel that is outside of and that is immediately adjacent to an edge of the first region of the first image and a value of a pixel that belongs to and that forms an edge of the second region of the second image.

6. The apparatus of claim 1 wherein the second unit is configured to determine the relationship between the reference motion vector and a motion vector for the second region by determining a difference between the motion vectors.

7. The apparatus of claim 1, further comprising a fourth unit configured to calculate a motion vector corresponding to the unrecovered third region of the second image from motion vectors of respective recovered regions of the second image that are adjacent to the unrecovered third region.

8. The apparatus of claim 1, further comprising a fourth unit configured to calculate a motion vector corresponding to the unrecovered third region of the second image from motion vectors of recovered regions of the second image that are adjacent to the unrecovered third region, the respective recovered regions including the second recovered region.

9. The apparatus of claim 1, further comprising:
a fourth unit configured to identify, from motion vectors of recovered regions of the second image that are adjacent to the unrecovered third region, an area of the first image that includes the first region and another region;
wherein the first unit is configured to determine a second level of distortion associated with the other region of the first image and with the recovered second region of the second image;
wherein the second unit is configured to determine a second relationship between a motion vector for the other region and the reference motion vector;
a fifth unit configured to generate a first combination of the first level of distortion and the first relationship, and to generate a second combination of the second level of distortion and the second relationship; and
wherein the third unit is configured to compare the first combination to the second combination and to replace the unrecovered third region of the second image with the first region of the first image in response to the comparison.

10. The apparatus of claim 1, further comprising:
a fourth unit configured to identify, from the reference motion vector and from motion vectors of recovered regions of the second image that are adjacent to the unrecovered third region, an area of the first image that includes the first region and another region;

wherein the first unit is configured to determine a second level of distortion associated with the other region of the first image and with the recovered second region of the second image;

wherein the second unit is configured to determine a second relationship between a motion vector for the other region and the reference motion vector;

a fifth unit configured to generate a first combination of the first level of distortion and the first relationship, and to generate a second combination of the second level of distortion and the second relationship; and wherein the third unit is configured to compare the first combination to the second combination and to replace the unrecovered third region of the second image with the first region of the first image in response to the comparison.

11. The apparatus of claim 1, further comprising:

a fourth unit configured to identify, from motion vectors of recovered regions of the second image that are adjacent to the unrecovered third region, an area of the first image that includes the first region and another region;

wherein the first unit is configured to determine a second level of distortion associated with the other region of the first image and with the recovered second region of the second image;

wherein the second unit is configured to determine a second relationship between a motion vector for the other region and the reference motion vector;

a fifth unit configured to generate a first combination of the first level of distortion and the first relationship, and to generate a second combination of the second level of distortion and the second relationship; and wherein the third unit is configured to replace the unrecovered third region of the second image with the first region of the first image if the first combination is less than the second combination.

12. An apparatus, comprising:

a first unit configured to determine a first level of distortion associated with a first region of a reference first image and with a recovered second region of a second image that is being decoded with reference to the first image, the second region being adjacent to an unrecovered third region of the second image;

a second unit configured to determine a first relationship between a reference motion vector and a motion vector for the second region; and a third unit configured to replace the unrecovered third region of the second image in response to the level of distortion associated with the first and second regions and in response to the relationship between the reference motion vector and the motion vector for the second region;

wherein the second unit is configured to determine the relationship between the reference motion vector and the motion vector for the second region by determining a product of a difference between the motion vectors and a weighting factor.

13. The apparatus of claim 12 wherein the third unit is configured to replace the unrecovered third region of the second image with the first region of the first image in response to a mathematical combination of the level of distortion associated with the first and second regions and the relationship between the reference motion vector and the motion vector for the second region.

14. An apparatus, comprising:

one or more inputs; and a decoder coupled to the one or more inputs, the decoder including:

circuitry configured to determine a first level of distortion associated with a first region of a reference first image and with a recovered second region of a second image decoded with reference to the first image, the second region being adjacent to an unrecovered third region of the second image;

circuitry configured to determine a first relationship between a reference motion vector and a motion vector for the second region; and circuitry configured to replace the unrecovered third region of the second image with the first region of the first image in response to a sum of the level of distortion associated with the first and second regions and the relationship between the reference motion vector and the motion vector for the second region.

15. An integrated circuit, comprising:

a decoder configured to decode a second image using a reference first image, the decoder including:

a first unit configured to determine a first level of distortion associated with a first region of the reference first image and with a decoded second region of the second image, the second region being adjacent to an undecoded third region of the second image;

a second unit configured to determine a first relationship between a motion vector for the second region and a reference motion vector; and a third unit configured to replace the undecoded third region of the second image with the first region of the first image in response to a sum of the first level of distortion associated with the first and second regions and the first relationship between the reference motion vector and the second motion vector.

16. The integrated circuit of claim 15, further comprising a memory coupled to the decoder and configured to store the reference first image.

17. The integrated circuit of claim 15, further comprising a controller coupled to the decoder.

18. A system, comprising:

a first integrated circuit, comprising:

an image decoder configured to decode a second image using a reference first image, the decoder including:

a first unit configured to determine a first level of distortion associated with a first region of the reference first image and with a decoded second region of the second image, the second region being adjacent to an undecoded third region of the second image;

a second unit configured to determine a first relationship between a reference motion vector and a motion vector for the second region; and a third unit configured to replace the undecoded third region of the second image with the first region of the first image in response to a sum of the first level of distortion associated with the first and second regions and the first relationship between the reference motion vector and the second motion vector; and a second integrated circuit coupled to the first integrated circuit.

19. The system of claim 18 wherein the first and second integrated circuits are disposed on a same die.

20. The system of claim 18 wherein the first and second integrated circuits are disposed on respective dies.

21. The system of claim 18 wherein the second integrated circuit comprises a processor.

22. The system of claim 18 wherein the second integrated circuit comprises a memory.

23. The system of claim 18 wherein the first integrated circuit comprises an image encoder.

24. A method, comprising:
   determining, using a decoder, a first level of distortion associated with a first region of a reference first image and with a recovered second region of a second image that is being decoded with reference to the first image, the second region being adjacent to an unrecovered third region of the second image;
   determining, using the decoder, a first relationship between a reference motion vector and a motion vector for the second region; and
   replacing, using the decoder, the unrecovered third region of the second image with the first region of the first image in response to a sum of the level of distortion associated with the first and second regions and the relationship between the reference motion vector and the motion vector for the second region.

25. The method of claim 24, comprising identifying the first region of the first image based on a motion vector of a respective region near the second region of the second image.

26. The method of claim 24, comprising:
   identifying a set of first regions of the first image based on a motion vector of a respective region near the second region of the second image; and
   identifying from the motion vector an area of the first image, the area including the identified first regions of the first image.

27. The method of claim 24, comprising
   identifying a set of first regions of the first image based on a motion vector of a respective region near the second region of the second image, the motion vector pointing to one of the identified first regions; and
   identifying from the motion vector an area of the first image, the area including the identified first regions of the first image.

28. The method of claim 24, comprising identifying a set of first regions based on motion vectors of respective regions near the second region of the second image.

29. The method of claim 28 wherein the motion vectors of the respective regions near the second region of the second image are motion vectors pointing to the first image.

30. The method of claim 28, comprising:
   selecting one of the first regions based on a motion vector from the second image to the selected first region of the first image.

31. The method of claim 28, comprising:
   selecting one of the set of first regions based on a first motion vector from the second image to the selected first region of the first image and on a second motion vector that is based on a combination of motion vectors from the second image to the identified first regions of the first image.

32. The method of claim 28, comprising:
   selecting one of the set of first regions based on a first motion vector from the second image to the selected first region of the first image and on a second motion vector that is based on a combination of motion vectors to the identified first regions of the first image from respective regions of the second image adjacent to the second region.

33. The method of claim 28, comprising:
   selecting one of the set of first regions based on a motion vector from a region of the second image adjacent to the second region to the selected first region of the first image.

34. The method of claim 28, comprising:
   selecting one of the set of first regions based on a level of distortion between a region of the second image adjacent to the second region and the selected first region.

35. The method of claim 28, comprising:
   selecting one of the set of first regions based on a level of distortion between a region of the second image adjacent to the second region and a region of the first image adjacent to the selected first region.

36. The method of claim 28, comprising:
   identifying a set of second regions of the first image; and
   selecting one of the set of second regions, wherein identifying the first set of first regions comprises identifying the set of first regions from the selected second region.

37. The method of claim 28, further comprising:
   identifying a set of second regions of the first image, the second regions having a lower resolution than the first regions; and
   selecting one of the set of second regions, wherein identifying the first set of first regions comprises identifying the set of first regions from the selected second region.

38. A non-transitory computer readable medium storing instructions that, when executed by a processor, cause the processor:
   determine a first level of distortion associated with a first region of a reference first image and with a recovered second region of a second image that is being decoded with reference to first image, the second region being adjacent to an unrecovered third region of the second image;
   determine a first relationship between a reference motion vector and a motion vector for the second region; and
   selectively replace the unrecovered third region of the second image with the first region of the first image in response to a sum of the level of distortion associated with the first and second regions and the relationship between the reference motion vector and the motion vector for the second region.

* * * * *